United States Patent
Ishikawa

(10) Patent No.: US 10,782,854 B2
(45) Date of Patent: Sep. 22, 2020

(54) DISPLAY CONTROL DEVICE, STORAGE MEDIUM, AND DISPLAY CONTROL METHOD

(71) Applicant: KYOCERA Document Solutions Inc., Osaka (JP)

(72) Inventor: Suguru Ishikawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/361,404

(22) Filed: Mar. 22, 2019

(65) Prior Publication Data
US 2019/0310745 A1 Oct. 10, 2019

(30) Foreign Application Priority Data

Apr. 4, 2018 (JP) ................................ 2018-072300

(51) Int. Cl.
*G06F 3/0482* (2013.01)
*G06F 3/0488* (2013.01)
*G06F 3/0485* (2013.01)

(52) U.S. Cl.
CPC .......... *G06F 3/0482* (2013.01); *G06F 3/0488* (2013.01); *G06F 3/04855* (2013.01)

(58) Field of Classification Search
CPC ... G06F 3/0482; G06F 3/04855; G06F 3/0488
See application file for complete search history.

(56) References Cited

U.S. PATENT DOCUMENTS

| | | | | |
|---|---|---|---|---|
| 5,553,225 A * | 9/1996 | Perry | .................. | G06F 3/04855 715/786 |
| 6,157,381 A * | 12/2000 | Bates | .................. | G06F 3/04855 345/684 |
| 7,934,169 B2 * | 4/2011 | Reponen | ............... | G06F 3/0236 715/784 |
| 8,082,518 B2 * | 12/2011 | Flake | .................... | G06F 3/0481 715/785 |
| 8,522,157 B2 * | 8/2013 | Park | .................. | H04M 1/72583 715/786 |
| 8,751,955 B2 * | 6/2014 | DeLuca | ................ | G06F 3/0485 715/784 |

(Continued)

FOREIGN PATENT DOCUMENTS

JP 2004139321 A 5/2004

OTHER PUBLICATIONS

Cahill, LM et al. Sizeable Scroll Bar Box for Text Display IBM Technical Disclosure Bulletin Apr. 1, 1994 TDB v37 n4A 04-94 p. 635-636 (Year: 1994).*

(Continued)

*Primary Examiner* — Andrea N Long
(74) *Attorney, Agent, or Firm* — Studebaker & Brackett PC

(57) ABSTRACT

A display control device includes a display section and a display controller. The display section displays, as a list screen, an image including a plurality of listing images, a scroll bar, and a slider. The display controller controls a displayed form of the listing images and a displayed shape of the slider. The display controller modifies the displayed form of the listing images and the displayed shape of the slider based on a total number of listing images displayable within the list screen or the displayed shape of the slider.

11 Claims, 7 Drawing Sheets

(56) References Cited

U.S. PATENT DOCUMENTS

Figure 1:
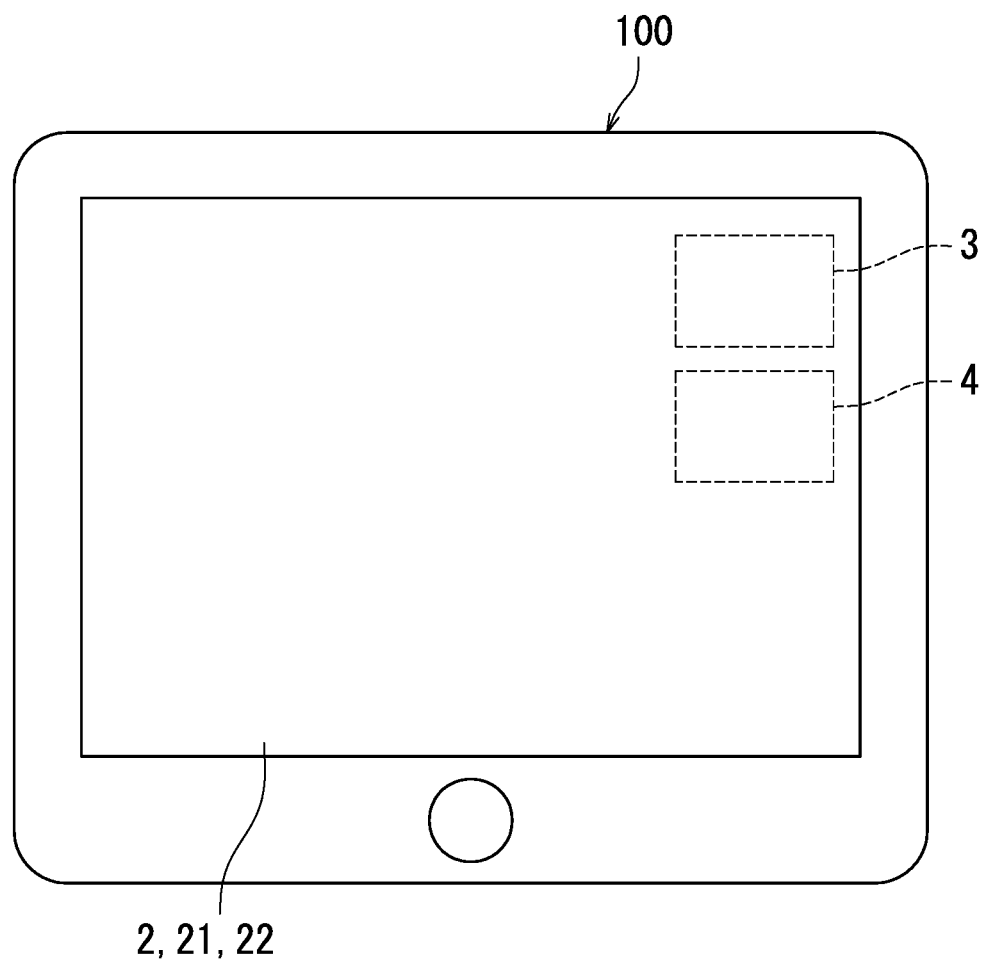

| | | | | |
|---|---|---|---|---|
| 8,954,882 B2* | 2/2015 | Miyoshi | | G06F 3/0485 |
| | | | | 715/784 |
| 8,977,982 B1* | 3/2015 | Amacker | | G06F 3/014 |
| | | | | 715/787 |
| 2002/0154173 A1* | 10/2002 | Etgen | | G06F 3/04855 |
| | | | | 715/833 |
| 2005/0005236 A1* | 1/2005 | Brown | | G06F 3/0485 |
| | | | | 715/246 |
| 2005/0068342 A1* | 3/2005 | Ouchi | | G06F 3/04855 |
| | | | | 345/684 |
| 2005/0210403 A1* | 9/2005 | Satanek | | G06F 3/04855 |
| | | | | 715/786 |
| 2007/0118810 A1* | 5/2007 | Ubillos | | G06F 3/04855 |
| | | | | 715/788 |
| 2007/0192744 A1* | 8/2007 | Reponen | | G06F 3/0236 |
| | | | | 715/833 |
| 2008/0034316 A1* | 2/2008 | Thoresson | | G06F 3/04855 |
| | | | | 715/781 |
| 2009/0070707 A1* | 3/2009 | Schaller | | G06F 3/04855 |
| | | | | 715/787 |
| 2014/0376046 A1* | 12/2014 | Okuma | | G06F 3/1204 |
| | | | | 358/1.15 |
| 2015/0193094 A1* | 7/2015 | Armitage | | G06F 16/904 |
| | | | | 715/825 |
| 2017/0090743 A1* | 3/2017 | Schaller | | G06F 3/04855 |

OTHER PUBLICATIONS

IBM Technical Disclosure Bulletin Zoom-Scale Using Conventional Scroll Bars vol. 39 No. 08 Aug. 1996 p. 151-152 (Year: 1996).*

* cited by examiner

DISPLAY CONTROL DEVICE, STORAGE MEDIUM, AND DISPLAY CONTROL METHOD

INCORPORATION BY REFERENCE

The present application claims priority under 35 U.S.C. § 119 to Japanese Patent Application No. 2018-072300, filed on Apr. 4, 2018. The contents of this application are incorporated herein by reference in their entirety.

BACKGROUND

The present disclosure relates to a display control device, a storage medium, and a display control method.

A known display device displays a display target such as an image. The display device may display a portion, such as a partial image, of the display target on a display section thereof. The display device then displays a scroll bar and a slider to indicate a location of the displayed portion in the entire display target. A known technique involves the use of a scroll bar in order to enhance operability of a display device.

SUMMARY

A display control device according to an aspect of the present disclosure includes a display section and a display controller. The display section displays, as a list screen, an image including a plurality of listing images, a scroll bar, and a slider. The display controller controls a displayed form of the listing images and a displayed shape of the slider. The display controller modifies the displayed form of the listing images and the displayed shape of the slider based on a total number of listing images displayable within the list screen or the displayed shape of the slider.

A storage medium according to another aspect of the present disclosure is a non-transitory computer-readable storage medium recording thereon a display control program for execution by a computer in a display control device including the computer and a touch panel. The display control program includes displaying, as a list screen, an image including a plurality of listing images, a scroll bar, and a slider; and controlling a displayed form of the listing images and a displayed shape of the slider. In the controlling, the displayed form of the listing images and the displayed shape of the slider are modified based on a total number of listing images displayable within the list screen or the displayed shape of the slider.

A display control method according to another aspect of the present disclosure is a display control method for controlling a display control device. The display control method includes displaying, as a list screen, an image including a plurality of listing images, a scroll bar, and a slider; and controlling a displayed form of the listing images and a displayed shape of the slider. In the controlling, the displayed form of the listing images and the displayed shape of the slider are modified based on a total number of listing images displayable within the list screen or the displayed shape of the slider.

BRIEF DESCRIPTION OF THE DRAWINGS

FIG. 1 is a diagram illustrating a display control device according to an embodiment of the present disclosure.

FIG. 2 is a diagram illustrating an example of a list screen that is displayed by a display section.

FIG. 3 is a diagram illustrating a first modification example of the list screen including a modification in a displayed form of a plurality of listing images displayed by the display section.

FIG. 4 is a diagram illustrating a second modification example of the list screen including a modification in the displayed form of the listing images displayed by the display section.

FIG. 5 is a diagram illustrating a third modification example of the list screen including a modification in the displayed form of the listing images displayed by the display section.

FIGS. 6A and 6B are diagrams illustrating when a display controller modifies the list screen including the listing images displayed on the display section.

FIG. 7 is a flowchart illustrating display control for the list screen that is performed by the display controller.

DETAILED DESCRIPTION

The following describes an embodiment of the present disclosure with reference to the accompanying drawings. Note that elements that are the same or equivalent are indicated by the same reference signs in the drawings, and description thereof is not repeated.

The following describes a display control device 100 according to the embodiment of the present disclosure with reference to FIGS. 1 to 7. First, functions of elements of the display control device 100 will be described with reference to FIGS. 1 and 2. FIG. 1 is a diagram illustrating the display control device 100 according to the embodiment of the present disclosure. FIG. 2 is a diagram illustrating an example of a list screen that is displayed by a display section.

The display control device 100 offers increased convenience in a scroll operation on a screen showing a list of items such as images through control of a displayed form of the items such as images. The display control device 100 is used as a part of an electronic device having a display device or another display function. The display control device 100 is for example used as a part of a smartphone or a personal computer.

The display control device 100 includes a touch panel 2, storage 3, and a display controller 4. A Y axis in FIG. 1 is parallel to long edges of the touch panel 2. The Y axis indicates a left-right direction. An X axis is parallel to short edges of the touch panel 2. The X axis indicates an up-down direction.

The touch panel 2 receives an instruction from a user. The touch panel 2 also displays an image. The touch panel 2 may have a rectangular shape. The touch panel 2 includes a reception section 21 and a display section 22. The display section 22 displays thereon a scroll bar 222 and a slider 221 for a scroll operation.

The reception section 21 receives various instructions through operations by the user. Particularly, the reception section 21 receives a touch operation on the scroll bar 222 or the slider 221 from the user. The reception section 21 is transparent and is disposed over the display section 22.

The display section 22 includes a screen that shows certain images. Particularly, the display section 22 displays an image including a plurality of listing images 240, the scroll bar 222, and the slider 221 as a list screen. The term “listing image” as used herein means an image indicating information about a single data file among a plurality of data files. Each listing image 240 may include an image indicating a display area for displaying the listing image 240. The term "data file" as used herein means a file containing data such as image data, text data, or audio data. The term "information about a data file" as used herein for example means a file name, an update date, a file type, or a data size.

The display section 22 may be a liquid-crystal display device or an organic electroluminescent (EL) display device. The user can input an instruction through the reception section 21 while viewing the images displayed in the screen of the display section 22.

The storage 3 stores therein control programs, a plurality of data files, and a modification mode flag. The control programs for example include a display control program to be executed by the display controller 4.

A value "1" or "0" is stored in the modification mode flag. A modification mode flag value of "1" indicates an automatic modification mode. The term "automatic modification mode" as used herein means a mode in which a displayed form of the listing images 240 and a displayed shape of the slider 221 are modified to a preset form and a preset shape. The "displayed form of the listing images and the displayed shape of the slider" may be written as "the displayed form of the listing images and the like". A modification mode flag value of "0" indicates a confirmed modification mode. The term "confirmed modification mode" as used herein means a mode in which an instruction from the user is received regarding modification of the displayed form of the listing images 240 and the like.

The storage 3 further stores data indicating an operation history including the frequency of operations on the slider 221 by the user. The storage 3 for example stores the number of operations on the slider 221 by a user specified by a user ID.

The storage 3 for example includes a hard disk, read-only memory (ROM), and random-access memory (RAM). The ROM is for example programmable ROM (PROM) such as flash memory. The RAM is for example dynamic RAM (DRAM). The storage 3 may further include a solid state drive (SSD).

The display controller 4 controls overall operation of the display control device 100 by executing the display control program stored in the storage 3. Particularly, the display controller 4 controls a list screen 245 that is displayed by the display section 22. The display controller 4 may be a processor such as a central processing unit (CPU). The display controller 4 may include an integrated circuit for operation of the display control device 100. The integrated circuit of the display control device 100 may for example be an application specific integrated circuit (ASIC).

The display controller 4 controls the displayed form of the listing images 240 and the displayed shape of the slider 221 in the list screen 245. Particularly, the display controller 4 controls modification of the displayed form of the listing images 240 and the displayed shape of the slider 221 based on the number of data files or the displayed shape of the slider 221.

For example, the display controller 4 determines that "a modification condition is met" and controls modification of the displayed form of the listing images 240 and the displayed shape of the slider 221 when the number of data files is more than a predetermined number or when the displayed shape of the slider 221 is smaller than a predetermined size. More specifically, the display controller 4 may determine that "a modification condition is met" when the number of data files is more than "100", which is an example of the predetermined number, or when an X-direction height 221a of the slider 221 is smaller than "5%" of an X-direction height of the list screen 245. Note that the values "100" and "5%" may be settable and changeable by the user.

The display controller 4 may read out data indicating the operation history including the number of operations on the slider 221 by the user from the storage 3 and determine whether or not the number of operations on the slider 221 is greater than or equal to a predetermined threshold. The display controller 4 may modify the displayed form of the listing images 240 and the displayed shape of the slider 221 when the display controller 4 determines that the number of operations is greater than or equal to the predetermined threshold. Note that the display control device 100 may have a configuration in which the threshold of the number of operations is settable and changeable by the user.

Alternatively, the display controller 4 may modify the displayed form of the listing images 240 and the displayed shape of the slider 221 when the display controller 4 determines that a screen image displayed by the display section 22 has transitioned to the list screen 245 from another screen. The display controller 4 can determine whether or not "a screen image displayed by the display section has transitioned to the list screen from another screen" depending on whether or not the currently displayed screen is showing the scroll bar 222 and the slider 221. The display controller 4 can determine that "a screen image displayed by the display section has transitioned to the list screen" when the screen image has transitioned to a screen that needs the scroll bar 222 and the slider 221 to be displayed.

Furthermore, the display controller 4 may modify the displayed form of the listing images 240 and the displayed shape of the slider 221 when the display controller 4 receives a touch operation on the slider 221 and an instruction to modify the displayed form of the listing images 240 and the displayed shape of the slider 221 through the reception section 21 after determining that the screen image has transitioned to the list screen.

Upon receiving a touch operation through the reception section 21, the display controller 4 may calculate a finger press size indicating an area receiving the touch operation. The term "finger press size" as used herein means an area of the touch operation received as an instruction. For example, the finger press size may be represented by the number of pixels indicating the area of the touch operation received as an instruction. The display controller 4 may determine whether or not the displayed form of the listing images 240 and the displayed shape of the slider 221 need to be modified based on the finger press size and the displayed shape of the slider 221.

Figure 2:
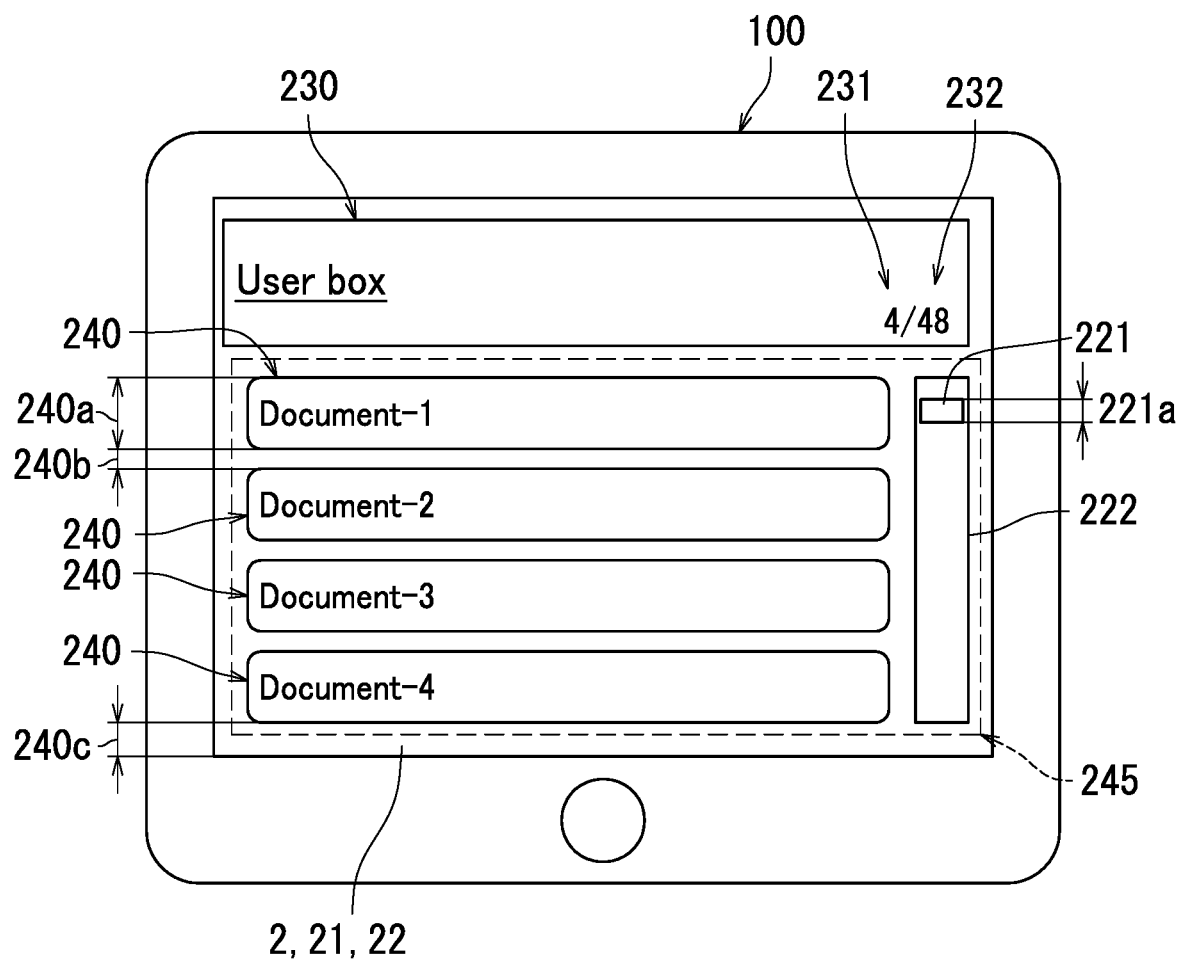

The following describes control of the list screen in detail with reference to FIG. 2. First, the listing images 240, the scroll bar 222, and the slider 221 that are displayed in the list screen 245 will be described.

The display controller 4 controls items such as images that are displayed in the list screen 245 on the display section 22. As illustrated in FIG. 2, the display section 22 for example displays a folder image 230 and the list screen 245. The list screen 245 for example shows the listing images 240, the slider 221, and the scroll bar 222.

The folder image 230 includes a name (for example, "user box") of a folder selected by the user, a number 231 of the displayed listing images 240, and a total number 232 of the listing images 240 kept in the folder. The number 231 of the displayed listing images 240 is a numerical value that varies depending on a position of the slider 221. The total number 232 of the listing images 240 is a numerical value that varies depending on the number of the listing images 240 kept in the folder.

The display controller 4 directs the display section 22 to display the slider 221 and the scroll bar 222 in the list screen 245. The display controller 4 also directs the display section 22 to move the slider 221 in the up-down direction in the list screen 245 according to a scroll operation by the user. The display controller 4 displays the slider 221 within the scroll bar 222 having a rectangular shape.

The slider 221 moves in the X axis direction within the scroll bar 222. Moving the slider 221 in the X axis direction can scroll and change the listing images 240 displayed in the list screen 245 in the X axis direction. In a configuration in which the scroll bar 222 is displayed so as to extend in the Y axis direction, the slider 221 moves in the Y axis direction within the scroll bar 222. Moving the slider 221 in the Y axis direction can scroll and change the listing images 240 displayed in the list screen 245 in the Y axis direction.

The display controller 4 directs the display section 22 to display the listing images 240 corresponding to the position of the slider 221 in the list screen 245. Thus, it is possible to find a listing image 240 desired by the user through a scroll operation on the slider 221.

Figure 3:
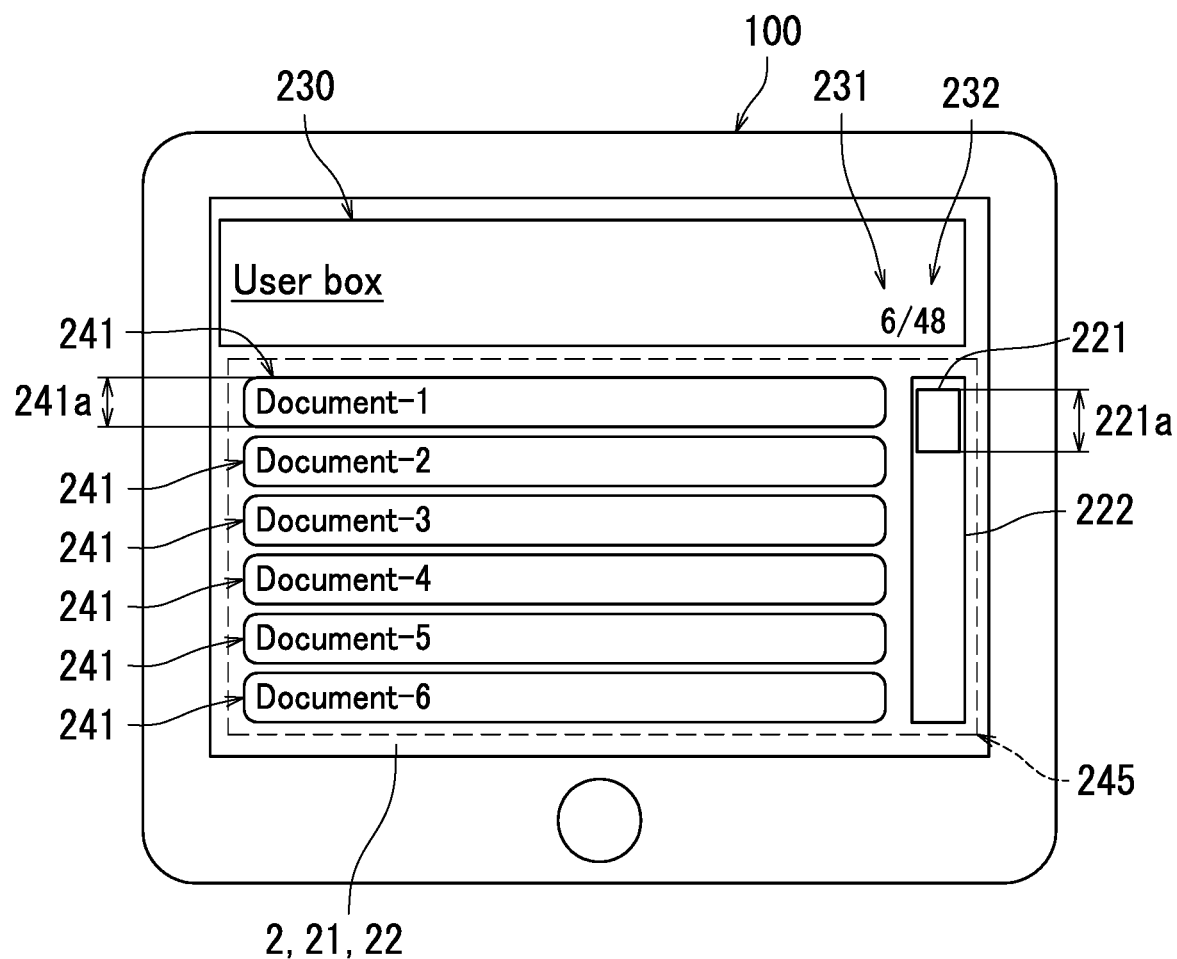
Figure 4:
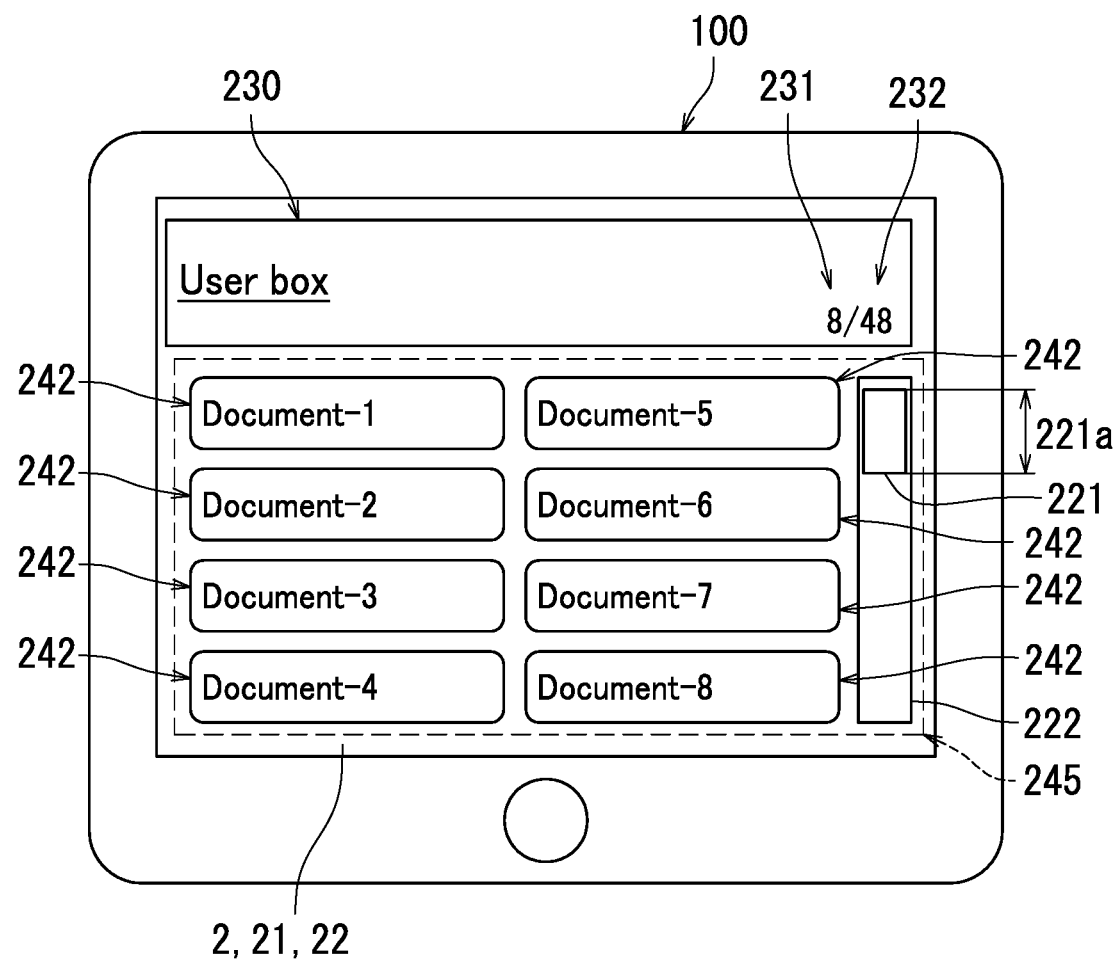
Figure 5:
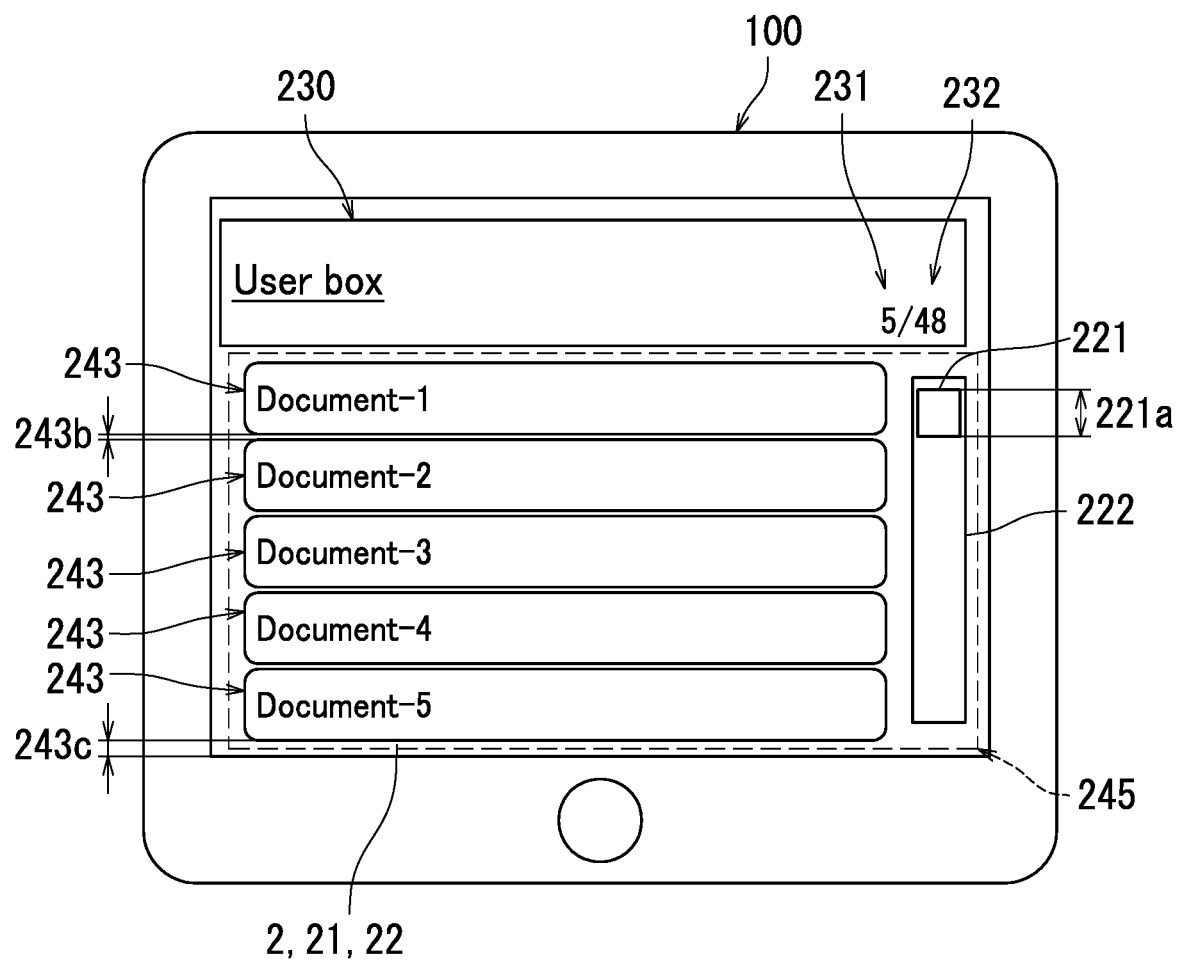

The following describes specific examples of modification of the displayed form of the listing images that is performed by the display controller 4 with reference to FIGS. 3 to 5. FIG. 3 is a diagram illustrating a first modification example of the list screen 245 including a modification in the displayed form of the listing images displayed by the display section. As illustrated in FIG. 3, the display controller 4 modifies the displayed form of listing images 241 so that the number of listing images 241 displayed in the X axis direction of the list screen 245 is greater than the number of listing images 240 displayed in the example illustrated in FIG. 2.

The display controller 4 also modifies the shape of the slider 221 as a consequence of the modification to obtain the displayed form of the listing images 241. Specifically, the display controller 4 modifies the displayed form of the listing images 241 so that a height 241a of the listing images 241 displayed after the modification is less than a height 240a of the listing images 240 displayed before the modification. The display controller 4 also modifies the displayed shape of the slider 221 so that a height 221a of the slider 221 displayed after the modification is greater than the height 221a of the slider 221 displayed before the modification.

More specifically, the display controller 4 controls the modification so that the height 241a of the listing images 241 is less than the height 240a of the listing images 240 illustrated in FIG. 2. For example, the display controller 4 controls the modification so that the height 241a of the listing images 241 is ⅔ of the height 240a of the listing images 240 illustrated in FIG. 2. Furthermore, the display controller 4 controls the modification so that the number of the displayed listing images 241 is greater than the number of the listing images 240 illustrated in FIG. 2 by two, which is equivalent to two rows. As a consequence of displaying the two rows of additional listing images 241, the display controller 4 also modifies the displayed shape of the slider 221 so that the slider 221 has a greater height in the X axis direction than that for the listing images 240 illustrated in FIG. 2. This change in the height of the slider 221 corresponds to the two rows of additional listing images 241.

FIG. 4 is a diagram illustrating a second modification example of the list screen including a modification in the displayed form of the listing images displayed by the display section. Specifically, the display controller 4 makes a modification to obtain the displayed form of listing images 242 in which the listing images 242 are displayed in a plurality of columns arranged in the Y axis direction of the list screen. The display controller 4 also extends the shape of the slider 221 according to the modification in the displayed form of the listing images 242. Specifically, the display controller 4 changes a width of the listing images 240 illustrated in FIG. 2 to 1/n thereof (n is a natural number of at least 2) so that n columns of listing images 242 are displayed in the list screen 245. The display controller 4 also modifies the displayed shape of the slider 221 so that the height 221a of the slider 221 displayed after the modification is greater than the height 221a of the slider 221 displayed before the modification.

More specifically, the display controller 4 controls the width of the listing images 242 so as to change the width of the listing images 242 to ½ of the width of the listing images 240 illustrated in FIG. 2. Furthermore, the display controller 4 controls the modification so as to display the listing images 242 in two columns. As a consequence of displaying the listing images 242 in two columns, the display controller 4 also modifies the displayed shape of the slider 221 so that the height of the slider 221 in the X axis direction increases. This change in the height of the slider 221 corresponds to the one column of additional listing images 242 (four rows of additional listing images 242) displayed in the list screen 245.

Note that the modification that is made by the display controller 4 is not limited to changing the width of the listing images 240 to 1/n thereof (n is a natural number of at least 2) so that n columns of listing images 242 are displayed in the list screen 245. For example, the modification that is made by the display controller 4 may be displaying (n+1) columns of listing images in the list screen 245 after displaying the n columns of listing images 242. In such a case, the display controller 4 may control the modification to change the width of the listing images 242 to (n/n+1) thereof and this change in the height of the slider 221 corresponds to the one column of additional listing images displayed in the list screen 245.

FIG. 5 is a diagram illustrating a third modification example of the list screen including a modification in the displayed form of the listing images displayed by the display section 22. As illustrated in FIG. 5, the display controller 4 makes a modification to obtain the displayed form of listing images 243 in which the number of the listing images 243 displayed in the X axis direction of the list screen is greater than the number of listing images 240 displayed in the example illustrated in FIG. 2. The display controller 4 also modifies the shape of the slider 221 as a consequence of the modification to obtain the displayed form of the listing images 243. Specifically, the display controller 4 modifies the displayed form of the listing images so that a width 243b illustrated in FIG. 5 is less than a width 240b illustrated in FIG. 2. The width 240b illustrated in FIG. 2 is a width of a space between adjacent listing images 240 displayed before the modification. The width 243b illustrated in FIG. 5 is a width of a space between adjacent listing images 243 displayed after the modification. The display controller 4 also modifies the displayed shape of the slider 221 so that the height 221a of the slider 221 displayed after the modification illustrated in FIG. 5 is greater than the height 221a of the slider 221 displayed before the modification illustrated in FIG. 2.

More specifically, the display controller 4 for example controls the modification so as to change the width 240b of the space between adjacent listing images 240 illustrated in FIG. 2 to ⅓ thereof. Furthermore, the display controller 4 controls the modification so as to display one row of additional listing image 243. As a consequence of displaying the one row of additional listing image 243, the display controller 4 also modifies the displayed shape of the slider 221 so that the slider 221 has a greater height in the X axis direction than that illustrated in FIG. 2. This change in the height of the slider 221 illustrated in FIG. 5 corresponds to the one row of additional listing image 243 displayed in the list screen 245.

Figure 6A:
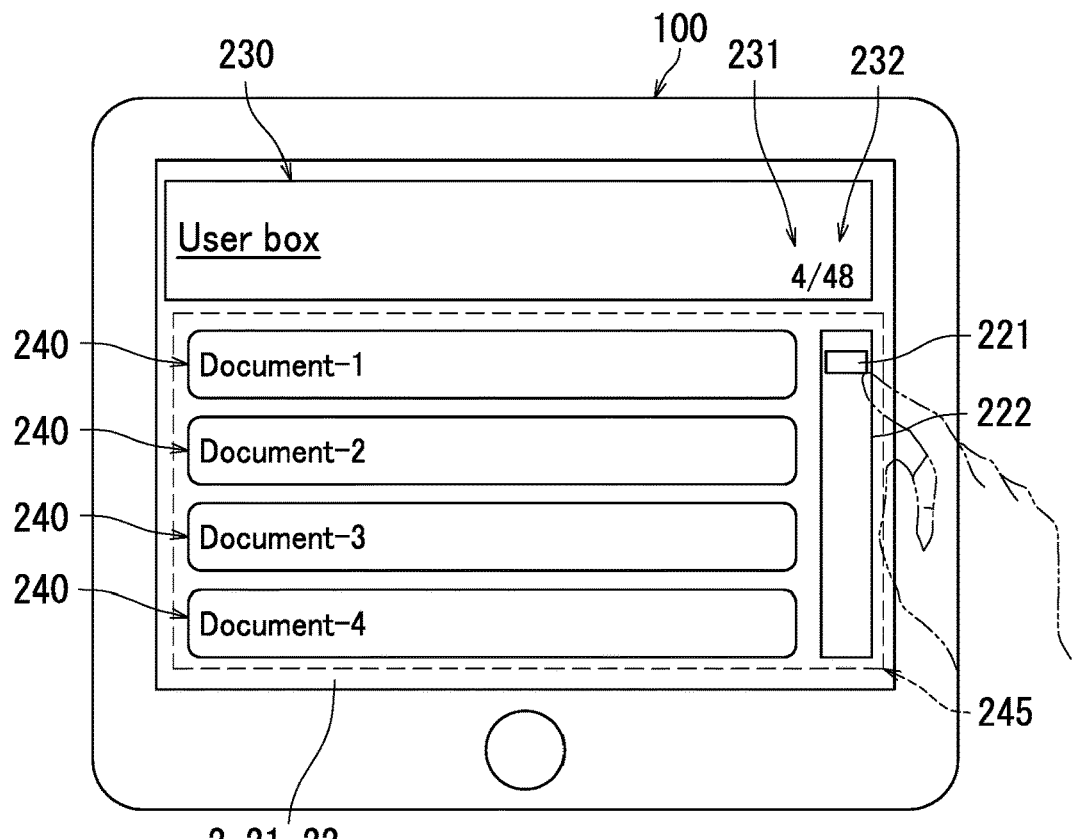
Figure 6B:
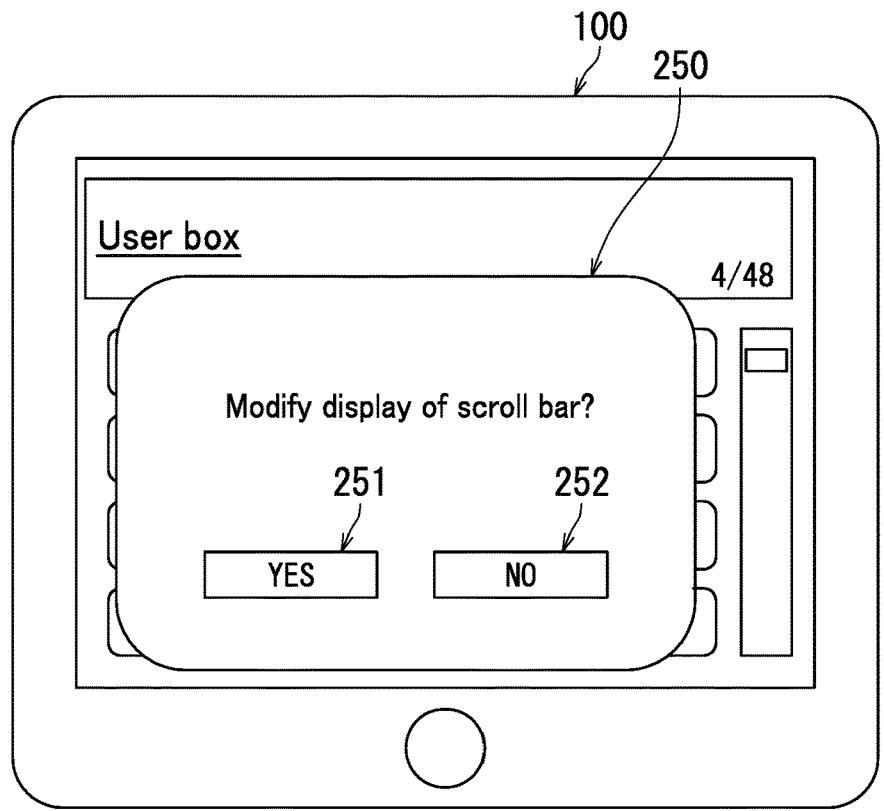

The following describes when the display controller 4 modifies the list screen 245 including the listing images displayed on the display section 22 with reference to FIGS. 6A and 6B. FIGS. 6A and 6B are diagrams illustrating when the display controller 4 modifies the list screen including the listing images displayed on the display section. The display controller 4 modifies the displayed form of the listing images 240 and the displayed shape of the slider 221 at a specific point. The term "specific point" as used herein means when the display controller 4 determines that the screen image displayed by the display section 22 has transitioned to the list screen 245, which is a target of the control according to the present disclosure, from another screen. More specifically, the display controller 4 modifies the displayed form of the listing images 240 and the displayed shape of the slider 221 when the reception section 21 receives a specific touch operation or an instruction from the user after the display controller 4 determining that the screen image displayed by the display section 22 has transitioned to the list screen 245. The condition "when the reception section 21 receives a specific touch operation or an instruction from the user" means that "when the reception section 21 receives a touch operation on the slider 221 from the user and further receives an instruction to modify the displayed form of the listing images 240 and the displayed shape of the slider 221 from the user".

First, as illustrated in FIG. 6A, the display controller 4 receives a touch operation on the slider 221 from the user through the reception section 21 after the screen image displayed by the display section 22 has transitioned to the list screen 245, which is a target of the control according to the present disclosure, from another screen. Upon receiving this touch operation, the display controller 4 newly displays a modification confirmation screen 250 as illustrated in FIG. 6B. Upon receiving pressing of a YES button 251 from the user viewing the modification confirmation screen 250 through the reception section 21, the display controller 4 modifies the displayed form of the listing images 240 and the displayed shape of the slider 221. Upon receiving pressing of a NO button 252 from the user viewing the modification confirmation screen 250 through the reception section 21, the display controller 4 does not modify the displayed form of the listing images 240 or the displayed shape of the slider 221.

Figure 7:
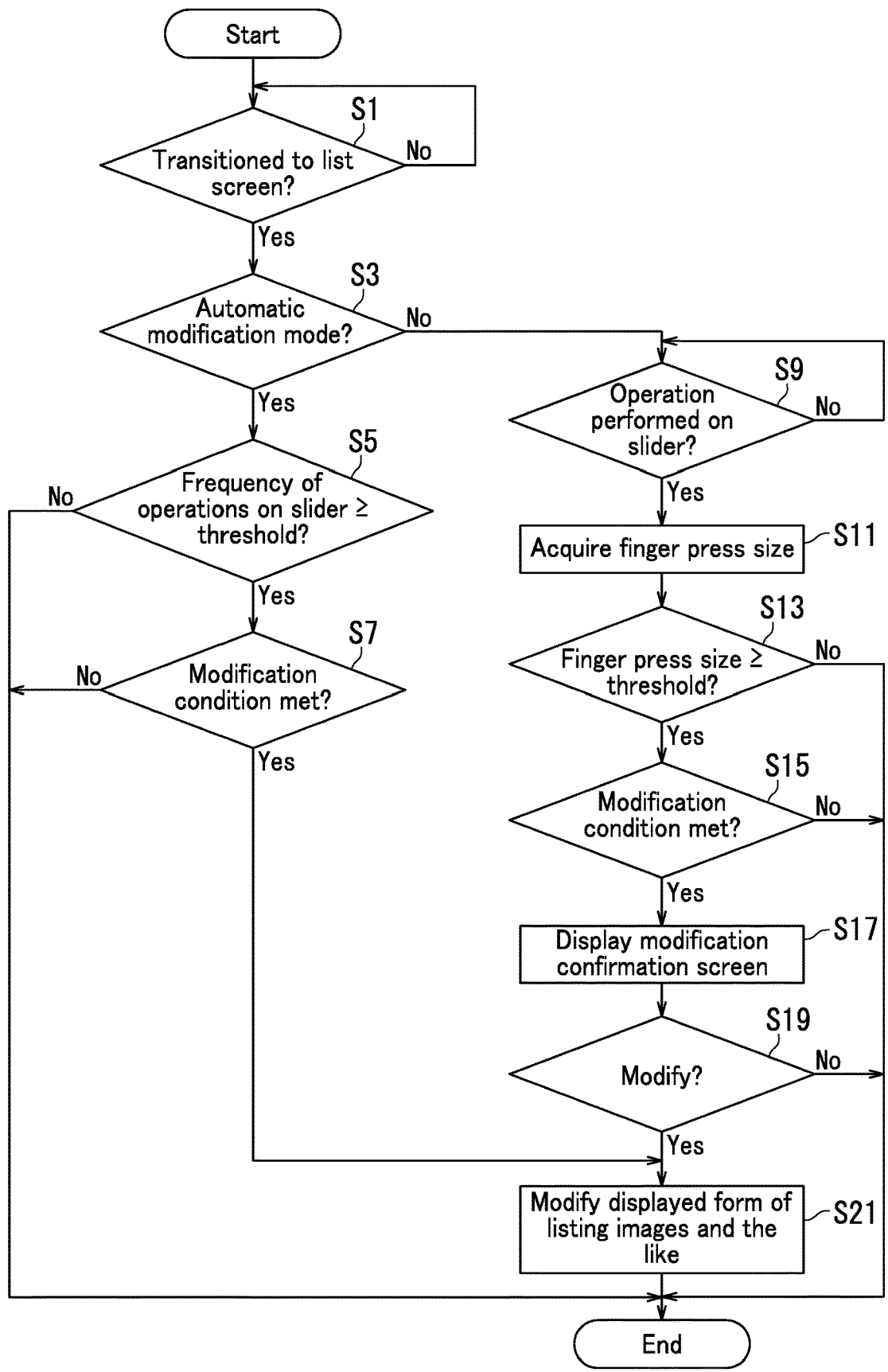

The following describes control of modification of the displayed form of the listing images by the display controller with reference to FIGS. 2 to 7. FIG. 7 is a flowchart illustrating display control for the list screen that is performed by the display controller. As illustrated in FIG. 7, the display controller 4 controls modification of the displayed form of the listing images and the displayed shape of the slider by performing a process through Steps S1 to S21.

Step S1: The display controller 4 determines whether or not the screen image displayed by the display section 22 has transitioned to the list screen 245. Upon the display controller 4 determining that the screen image has transitioned (Yes in Step S1), the process proceeds to Step S3. Upon the display controller 4 determining that the screen image has not transitioned to the list screen 245 (No in Step S1), the process remains on standby until the image transitions to the list screen 245.

Step S3: The display controller 4 refers to the modification mode flag stored in the storage 3 to determine whether or not the modification mode flag value is "1" indicating the automatic modification mode. Upon the display controller 4 determining that the modification mode flag value is "1" (Yes in Step S3), the process proceeds to Step S5. Upon the display controller 4 determining that the modification mode flag value is not "1" (No in Step S3), the process proceeds to Step S9.

Step S5: The display controller 4 refers to the operation history data stored in the storage 3 to see the frequency of operations on the slider 221. Upon the display controller 4 determining that the frequency of operations on the slider 221 by the user is greater than or equal to the predetermined threshold (Yes in Step S5), the process proceeds to Step S7. Upon the display controller 4 determining that the frequency of operations on the slider 221 by the user is lower than the predetermined threshold (No in Step S5), the process ends. When No in Step S5, the display controller 4 decides that the number of operations on the slider 221 by the user is so low that the user will be less affected by a reduction in size of the slider 221.

Step S7: The display controller 4 determines whether or not the modification condition is met with respect to the list screen 245 to be displayed after the image screen transition. Upon the display controller 4 determining that the modification condition is met (Yes in Step S7), the process proceeds to Step S21. Upon the display controller 4 determining that the modification condition is not met (No in Step S7), the process ends.

Step S9: The display controller 4 determines whether or not a touch operation has been performed on the slider 221 in the list screen 245. Upon the display controller 4 determining that a touch operation has been performed on the slider 221 (Yes in Step S9), the process proceeds to Step S11. Upon the display controller 4 determining that a touch operation has not been performed on the slider 221 (No in Step S9), the process remains on standby until a touch operation is performed on the slider 221.

Step S11: The display controller 4 acquires the finger press size based on the touch operation by the user. The process proceeds to Step S13.

Step S13: The display controller 4 determines whether or not the finger press size is greater than or equal to a predetermined threshold. Upon the display controller 4 determining that the finger press size is greater than or equal to the threshold (Yes in Step S13), the process proceeds to Step S15. Upon the display controller 4 determining that the finger press size is less than the threshold (No in Step S13), the process ends. When No in Step S13, the display controller 4 decides that the finger press size of the user is so small for the shape of the slider 221 that convenience in operation of the slider 221 can be maintained.

Step S15: The display controller 4 determines whether or not the modification condition is met with respect to the list screen 245 to be displayed after the image screen transition. Upon the display controller 4 determining that the modification condition is met (Yes in Step S15), the process proceeds to Step S17. Upon the display controller 4 determining that the modification condition is not met (No in Step S15), the process ends.

Step S17: The display controller 4 directs the display section 22 to display the modification confirmation screen and waits for an instruction from the user as to whether or not to modify the displayed form of the listing images 240 and the like.

Step S19: The display controller 4 receives an instruction from the user as to whether or not to modify the displayed form of the listing images 240 and the like. Upon the display controller 4 receiving an instruction to modify the displayed form of the listing images 240 and the like from the user (Yes in Step S19), the process proceeds to Step S21. Upon the display controller 4 receiving an instruction to not modify the displayed form of the listing images 240 and the like from the user (No in Step S19), the process ends.

Step S21: The display controller 4 modifies the displayed form of the listing images 240 and the displayed shape of the slider 221 in accordance with predetermined form and shape, and the process ends.

Note that Steps S5 and S11 may be skipped.

As described with reference to FIGS. 1 to 7, the display control device 100 modifies the displayed form of the listing images 240 based on the number of data files and the displayed shape of the slider 221, and also extends the displayed shape of the slider 221 according to the modification in the displayed form of the listing images 240 to enable easy operation of the slider 221 even when the slider 221 displayed in the screen is small. Thus, the display control device 100 can offer increased convenience in the scroll operation.

Through the above, an embodiment of the present disclosure has been described with reference to the drawings (FIGS. 1 to 7). However, the present disclosure is not limited to the above embodiment and may be implemented in various different forms that do not deviate from the essence of the present disclosure. A plurality of elements of configuration disclosed in the above embodiment can be combined as appropriate to form various disclosures. For example, some of the elements of configuration included in the above embodiment may be omitted. Furthermore, elements of configuration in different embodiments may be combined as appropriate. The drawings schematically illustrate elements of configuration in order to facilitate understanding and properties of elements of configuration illustrated in the drawings, such as thickness, length, and number thereof, may differ from actual properties thereof in order to facilitate preparation of the drawings. Furthermore, properties of elements of configuration described in the above embodiment, such as rate, material, shape, and dimensions, are merely examples and are not intended as specific limitations. Various alterations may be made so long as there is no substantial deviation from the configuration of the present disclosure.

Furthermore, the present disclosure can be implemented as a display control method including steps performed through the characteristic elements of configuration of the display control device according to the present disclosure or as a program including such steps. The program can be distributed via storage media such as CD-ROM or transmission media such as a communication network.

What is claimed is:

1. A display control device comprising:
a display section configured to display, as a list screen, an image including a plurality of listing images, a scroll bar, and a slider; and
a display controller configured to control a displayed form of the listing images and a displayed shape of the slider, wherein
the display controller modifies the displayed form of the listing images and the displayed shape of the slider based on a total number of listing images displayable within the list screen or the displayed shape of the slider,
the display control device further comprises storage,
the storage stores therein data indicating an operation history including frequency of operations on the slider,
the display controller modifies the displayed form of the listing images and the displayed shape of the slider when the frequency of operations is greater than or equal to a predetermined threshold,
the display section includes a liquid-crystal device or an organic electroluminescent display device,
the display controller includes a processor or an integrated circuit, and
the storage includes at least one of a hard disk drive, read-only memory, random-access memory, and a solid-state drive.

2. The display control device according to claim 1, wherein
the display controller determines whether or not a screen image displayed by the display section has transitioned to the list screen from another screen,
the display controller modifies the displayed form of the listing images and the displayed shape of the slider when determining that the screen image displayed by the display section has transitioned to the list screen from another screen.

3. The display control device according to claim 2, further comprising:
a touch panel including the display section, wherein
the touch panel receives an instruction from a user,
the display controller modifies the displayed form of the listing images and the displayed shape of the slider when the touch panel receives a touch operation on the scroll bar or the slider and an instruction to modify the displayed form of the listing images and the displayed shape of the slider after the display controller determining that the screen image has transitioned to the list screen.

4. The display control device according to claim 3, wherein
upon receiving the touch operation, the display controller calculates a finger press size indicating an area receiving the touch operation, and
the display controller determines whether or not the displayed form of the listing images and the displayed shape of the slider need to be modified based on the finger press size and the displayed shape of the slider.

5. The display control device according to claim 1, wherein
the display controller modifies the displayed form of the listing images so that a height of the listing images displayed after the modification is less than a height of the listing images displayed before the modification, and
the display controller modifies the displayed shape of the slider so that a height of the slider displayed after the modification is greater than a height of the slider displayed before the modification.

6. The display control device according to claim 1, wherein
the display controller modifies the displayed form of the listing images to change a width of the listing images displayed before the modification to 1/n thereof so that n columns of listing images are displayed in the list screen, n being a natural number of at least 2, and the display controller modifies the displayed shape of the slider so that a height of the slider displayed after the modification is greater than a height of the slider displayed before the modification.

7. The display control device according to claim 6, wherein the display controller changes the width of the n columns of listing images to (n/n+1) thereof so that (n+1) columns of listing images are displayed in the list screen, the width of the n columns of listing images being 1/n of the width of the listing images displayed before the modification, and the display controller changes the height of the slider so that the change in the height of the slider corresponds to the one column of additional listing images displayed in the list screen.

8. The display control device according to claim 1, wherein the display controller modifies the displayed form of the listing images so that a width of a space between adjacent listing images displayed after the modification is smaller than a width of a space between adjacent listing images displayed before the modification, and the display controller modifies the displayed shape of the slider so that a height of the slider displayed after the modification is greater than a height of the slider displayed before the modification.

9. A non-transitory computer-readable storage medium recording thereon a display control program for execution by a computer in a display control device including the computer and a touch panel, the display control program comprising:

displaying, as a list screen, an image including a plurality of listing images, a scroll bar, and a slider;

controlling a displayed form of the listing images and a displayed shape of the slider; and storing data indicating an operation history including frequency of operations on the slider, wherein in the controlling, the displayed form of the listing images and the displayed shape of the slider are modified based on a total number of listing images displayable within the list screen or the displayed shape of the slider, and in the controlling, the displayed form of the listing images and the displayed shape of the slider are modified when the frequency of operations is greater than or equal to a predetermined threshold.

10. A display control method for controlling a display control device, comprising:

displaying, as a list screen, an image including a plurality of listing images, a scroll bar, and a slider;

controlling a displayed form of the listing images and a displayed shape of the slider; and storing data indicating an operation history including frequency of operations on the slider, wherein in the controlling, the displayed form of the listing images and the displayed shape of the slider are modified based on a total number of listing images displayable within the list screen or the displayed shape of the slider, and in the controlling, the displayed form of the listing images and the displayed shape of the slier are modified when the frequency of operations is greater than or equal to a predetermined threshold.

11. A display control device comprising:

a display section configured to display, as a list screen, an image including a plurality of listing images, a scroll bar, and a slider; and a display controller configured to control a displayed form of the listing images and a displayed shape of the slider, wherein the display controller modifies the displayed form of the listing images and the displayed shape of the slider based on a total number of listing images displayable within the list screen or the displayed shape of the slider, the display controller determines whether or not a screen image displayed by the display section has transitioned to the list screen from another screen, the display controller modifies the displayed form of the listing images and the displayed shape of the slider when determining that the screen image displayed by the display section has transitioned to the list screen from another screen, the display section includes a liquid-crystal device or an organic electroluminescent display device, and the display controller includes a processor or an integrated circuit.

* * * * *